United States Patent
Rothenberg (10) Patent No.: US 7,155,179 B1
(45) Date of Patent: Dec. 26, 2006

(54) FULL DUPLEX TRANSCEIVER HAVING A METHOD FOR IMMUNIZING ITSELF AGAINST SELF-JAMMING

(75) Inventor: Bret Rothenberg, Los Altos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 747 days.

(21) Appl. No.: 09/906,292

(22) Filed: Jul. 16, 2001

(51) Int. Cl.
*H04B 1/04* (2006.01)

(52) U.S. Cl. .................... 455/114.2; 455/1; 455/73; 455/78; 455/83; 455/84; 455/141; 455/283; 455/296

(58) Field of Classification Search .............. 455/1, 455/73, 78, 83, 84, 141, 114.2, 283, 296, 455/24
See application file for complete search history.

(56) References Cited

U.S. PATENT DOCUMENTS

| | | | |
|---|---|---|---|
| 4,363,129 A * | 12/1982 | Cohn et al. ............... | 455/17 |
| 4,475,246 A * | 10/1984 | Batlivala et al. .......... | 455/18 |
| 5,444,865 A * | 8/1995 | Heck et al. ............... | 455/86 |
| 5,691,987 A * | 11/1997 | Friederichs .............. | 370/488 |
| 6,771,931 B1 * | 8/2004 | Waltho ..................... | 455/24 |

OTHER PUBLICATIONS

Hornak, Knudsen, Grzegorek, Nishimura, and McFarland "An Image-Rejecting Mixer and Vector Filter with 55-dB Image Rejection over Process, Temperature, and Transistor Mismatch", IEEE Journal of Solid-State Circuits, vol. 36, No. 1, published by IEEE, Jan. 2001.

* cited by examiner

*Primary Examiner*—Wing Chan
*Assistant Examiner*—Quynh H. Nguyen
(74) *Attorney, Agent, or Firm*—Steven A. Shaw; W. James Brady; Frederick J. Telecky, Jr.

(57) ABSTRACT

A full-duplex transceiver using a method immunizing itself against self-jamming. The transceiver includes a receiver and a transmitter. The receiver includes a frequency immunization converter and a high pass IF filter. The transmitter transmits a TX signal. The receiver receives an RX signal and simultaneously receives a portion of the power of the TX signal as an undesired TX jamming signal. The frequency immunization converter uses the center frequency of the TX signal for downconverting the RX signal to an IF signal and simultaneously downconverting the TX jamming signal to near zero frequency. The high pass IF filter passes the IF signal and blocks the signal at near zero frequency. As a consequence of the downconversion using the TX frequency, a second LO frequency is controlled for avoiding image frequencies.

28 Claims, 3 Drawing Sheets

| SELECTION ALTERNATIVES | TX>RX | | TX<RX | |
|---|---|---|---|---|
| | 101 | 102 | 103 | 104 |
| SECOND LO FREQUENCY (FROM 86) | LOW | HIGH | HIGH | LOW |
| IMAGE FILTER (82) | HIGH | LOW | LOW | HIGH |
| FIRST SELECTABLE INVERTER (92A) | + | + | − | − |
| SECOND SELECTABLE INVERTER (92B) | − | − | + | + |
| THIRD SELECTABLE INVERTER (92C) | + | − | + | − |

FULL DUPLEX TRANSCEIVER HAVING A METHOD FOR IMMUNIZING ITSELF AGAINST SELF-JAMMING

BACKGROUND OF THE INVENTION

1. Field of the Invention

The invention relates generally to full duplex transceivers and more particularly to a full-duplex transceiver having a method for immunizing itself against self-jamming.

2. Description of the Prior Art

A transceiver can be designed as full duplex or half duplex. A full duplex transceiver receives and transmits signals simultaneously. In contrast, a half duplex transceiver receives signals during different time periods than it transmits signals. In a communication system, the simultaneous transmission and reception of signals results in a full duplex transceiver having a higher information rate than a half-duplex transceiver. However, a full duplex receiver is susceptible to a problem called "self-jamming".

Self-jamming occurs when a portion of the power of the transmit signal crosses over into the receiver. Because the power level in the transmit signal is so much greater than the power level in the receive signal, even a small portion of the transmit signal power can overwhelm the receive signal and jam the receiver so that the receiver cannot properly receive the receive signal.

Existing full duplex transceivers attempt to resolve the self-jamming problem by transmitting and receiving signals in different frequency bands and then filtering the input to the receiver to pass signal frequencies in the receive frequency band while suppressing signal frequencies in the transmit frequency band. However, practical filters can never suppress 100% of the transmit signals and filters designed to approach 100% suppression are difficult and costly to produce. Moreover the transmit and receive frequency bands may be adjacent or nearly adjacent in order to meet licensing regulations, thereby further increasing the costliness and difficulty of producing the filters. Surface acoustic wave (SAW) filters are used in order to provide the very sharp transitions required for filtering adjacent or nearly adjacent frequency bands. However, SAW filters have a disadvantage that they cannot be integrated into an integrated circuit with standard integrated circuit technology.

Another approach for resolving the self-jamming problem involves the use of separate antennas for transmitting and receiving signals. However, this approach is not entirely successful because it increases cost, and the receive antenna inevitably receives some portion of the high power transmit signals through the air from the transmit antenna. Other approaches involve the use of directional devices, such as isolators, circulators, hybrid couplers and the like, for separating the transmit signals from the receive signals in a shared antenna. However, these approaches are only partially successful because limitations in the directivity of the directional devices and impedance mismatches in the directional device and antenna cause some portion of the transmit signal to cross over into the receiver. Typically, a combination of these approaches is used. However, none of the approaches or combinations tried to date has been entirely successful at a reasonable cost.

There continues to be a need for resolving the problem of self-jamming in a full duplex transceiver.

SUMMARY OF THE INVENTION

It is therefore an object of the present invention to provide a method and apparatus for suppressing self-jamming in a full duplex transceiver by using information for the center frequency of the transmit (TX) signal for immunizing the receiver.

Briefly, in a preferred embodiment, a full duplex transceiver of the present invention includes a receiver and a transmitter. The receiver receives a desired receive (RX) signal at an RX frequency and simultaneously receives a portion of the power of a transmit (TX) signal from the transmitter as an undesired TX jamming signal. The receiver includes a frequency immunization converter and a high pass filter. The frequency immunization converter uses the center frequency of the TX signal for downconverting the RX signal to an intermediate frequency (IF) signal at an IF frequency and simultaneously downconverting the TX jamming signal to a jamming residual at near to zero frequency. The high pass filter passes the IF signal and blocks the jamming residual. Preferably, the receiver also includes a second local signal generator that is switched between second LO frequencies above and below a first IF frequency; and one or more selectable inverters that are switched for inverting or non-inverting first and/or second IF signals. The second LO frequencies and the inversions are controlled by programming in a microprocessor system according to the RX frequency and the TX center frequency in order to avoid certain undesired RX image frequencies.

An advantage of the present invention is that the frequency immunization converter enables a simple and inexpensive filter to be used in place of more complex and costly filters for suppressing a self-jamming signal. Another advantage of the present invention is that the filter for suppressing self-jamming can be integrated into an integrated circuit using standard integrated circuit technology. Another advantage of the present invention is that undesired image frequencies in the RX signal are avoided or suppressed by selectably switching a second LO frequency and inverting or non-inverting IF signals.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
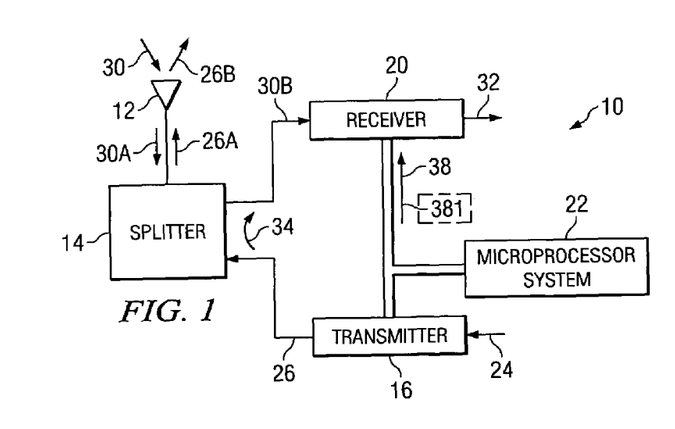
FIG. 1 is a block diagram of a full duplex transceiver of the present invention that immunizes itself from self-jamming.

FIG. 1 is a block diagram of a full duplex transceiver of the of the present invention referred to by a general reference number 10. The transceiver 10 includes an antenna 12, a splitter 14, a transmitter 16, and a receiver 20. In a preferred embodiment, a microprocessor system 22 is shared and included in both the transmitter 16 and the receiver 20.

The transmitter 16 receives input information 24 in a baseband signal; modulates the input information 24 onto a carrier; and issues the modulated carrier in a transmit (TX) signal 26 to the splitter 14. The splitter 14 passes the TX signal 26 as a TX signal 26A to the antenna 12. The antenna 12 converts the TX signal 26A from a conducted to a radiated form and issues a radiated TX signal 26B as an airwave. Simultaneously, the antenna 12 receives a receive (RX) signal 30 as an airwave and converts the airwave RX signal 30 into a conducted RX signal 30A. The splitter 14 receives the conducted RX signal 30A and passes it to the receiver 20 as an RX signal 30B. The receiver 20 demodulates the RX signal 30B and issues a baseband signal having output information 32 that is representative of the input information 24.

The TX signal 26B is transmitted in a TX frequency channel within a TX frequency band. At the same time, the RX signal 30 is received in an RX frequency channel within an RX frequency band. In some instances the TX signal 26B and/or the RX signal 30 are further confined into subchannels. At any one time the TX and RX frequency channels and/or subchannels are separate. In a preferred embodiment the TX signal 26B and the RX signal 30 are transmitted and received, respectively, in time slots of a time division multiple access (TDMA) communication plan.

The splitter 14 preferably includes a diplexer or separate filters so that signal frequencies in the TX frequency channel are passed from the transmitter 16 to the antenna 12 but are not passed to the receiver 20. The splitter 14 may also include one or more directional devices, such as a isolators, circulators, directional couplers and the like, for preventing the transmit signals 26, 26A, and 26B from coupling into the receiver 20. However, limitations in the stop band signal suppression of the filters; limitations of the directivity in the directional devices; impedance mismatches and other imperfections in the splitter 14 and/or antenna 12; and/or crosstalk from the transmitter 16 to the receiver 20 inevitably cause some portion of the TX signal 26 to leak into the receiver 20 as an undesired TX jamming signal 34.

The TX jamming signal 34 has the same signal frequencies and center frequency as the TX signal 26. If the signal level of the undesired TX jamming signal 34 is too strong with respect to the signal level of the desired RX signal 30B, the receiver 20 is "jammed", meaning that the receiver 20 is partially or completely overwhelmed by the TX jamming signal 34. When the receiver 20 is jammed, its ability to provide the output information 32 that is a correct representation of the input information 24 is impaired or eliminated.

The transmitter 16 includes one or more signal generators having frequencies that are controlled by frequency data from the microprocessor system 22 for setting the center frequency of the TX signal 26. This center frequency, termed herein a TX center frequency 38, places the TX signal 26 in a selected TX frequency channel or subchannel. The TX center frequency 38 may change or hop as the TX signal 26 changes or hops among channels or subchannels. However, at any one time there is a current frequency for the TX center frequency 38. Typically, the TX center frequency 38 is the carrier frequency, even when the carrier is suppressed, of the TX signal 26. However, in the case of single sideband transmission the TX center frequency 38 is offset by a known frequency from the carrier frequency.

In the present invention, the receiver 20 uses information for the TX center frequency 38 for immunizing itself from jamming by the TX jamming signal 34 even when the TX jamming signal 34 is relatively large with respect to the RX signal 30B. Preferably, the information used by the receiver 20 for the TX center frequency 38 is in the form of data from the microprocessor system 22. The microprocessor system 22 computes this data for the TX center frequency 38 in the same manner as it computes the frequency data that it provides to the transmitter 16 for controlling the frequencies of the signal generators in the transmitter 16. However, in an alternative embodiment the receiver 20 uses the actual local signals from the one or more signal generators in the transmitter 16 or a combination of the signals and microprocessor data for the TX center frequency 38. In some cases, the use of the actual signals is preferred in order to reduce cost by using some of the same signal generator hardware for both the transmitter 16 and the receiver 20.

Figure 2:
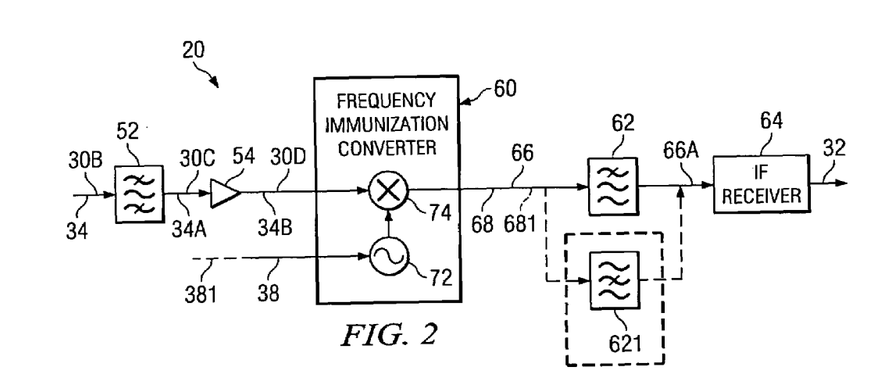
FIG. 2 is a block diagram of a receiver of the transceiver of FIG. 1 having a frequency immunization converter.

FIG. 2 is a block diagram of the receiver of the present invention referred with the reference number 20. The receiver 20 includes a bandpass filter 52, a low noise amplifier 54, a frequency immunization converter 60, a high pass filter 62, and an intermediate frequency (IF) receiver 64.

The receiver 20 receives the desired RX signal 30B and simultaneously receives the undesired TX jamming signal 34. The bandpass filter 52 at the front end of the receiver 20 passes signal frequencies within a prescribed RX frequency band for the RX signal 30 and suppresses signals having frequencies outside this band. In an alternative embodiment, the function of the bandpass filter 52 is included within the splitter 14 (FIG. 1). The bandpass filter 52 passes a filtered RX signal 30C to the low noise amplifier 54. The low noise amplifier 54 amplifies the filtered RX signal 30C and passes a filtered amplified RX signal 30D to the frequency immunization converter 60.

The bandpass filter 52 provides some suppression of the TX jamming signal 34 with respect to the RX signal 30B. However, because the TX jamming signal 34 may be very strong and because 100% suppression of out of band signals is not possible, a portion of the TX jamming signal 34 passes through the bandpass filter 52 as a partially suppressed TX jamming signal 34A. The low noise amplifier 54 amplifies the TX jamming signal 34A and passes an amplified TX jamming signal 34B to the frequency immunization converter 60. It should be noted that the filter 52 must have sufficient dynamic range for filtering the RX signal 30B in the presence of the TX jamming signal 34, the low noise amplifier 54 must have sufficient dynamic range for amplifying the RX signal 30C in the presence of the TX jamming signal 34A, and the frequency immunization converter 60 must have sufficient dynamic range for frequency converting the RX signal 30D in the presence of the TX jamming signal 34B.

The frequency immunization converter 60 converts the signal frequencies of the RX signal 30D to an intermediate frequency (IF) signal 66 at frequencies equal to the difference between frequencies of the RX signal 30D and the TX center frequency 38 and simultaneously converts the TX jamming signal 34B to a residual jamming signal 68 having a center frequency of approximately zero frequency (DC). Preferably, the IF signal 66 has a relatively wide frequency range in order to accommodate a relatively wide RX frequency band. The high pass filter 62 passes the IF signal 66 as an IF signal 66A and blocks the residual jamming signal 68.

The high pass filter 62 must have a sufficiently sharp frequency cutoff to effectively eliminate the residual jamming signal 68 while passing the IF signal 66. It is much less difficult to produce the high pass filter 62 having this sufficiently sharp cutoff than it would be to produce the bandpass filter 52 having a sufficiently sharp cutoff because there is a greater ratio of the frequencies of the IF signal 66 to the residual jamming signal 68 than the ratio of the frequencies of the RX signal 30B to the TX jamming signal 34.

In order to mix the TX jamming signal 34B to near zero frequency is not required that the TX center frequency 38 be exactly the center of the TX signal 26 but only that it be close enough that the ratio is large enough between the frequency of the IF signal 66 and the near zero frequency of the jamming residual signal 68 for the high pass filter 62 to substantially eliminate the residual jamming signal 68.

The ratio of the lower edge of the lowest IF signal 66 to the upper edge of the residual jamming signal 68, in a preferred embodiment, should be three (3) or greater. As an example assume the following: a bandwidth of K for the TX signal 26; a difference of L between the true center frequency of the TX signal 26 and the TX center frequency 38; and a bandwidth of M for the RX signal 30. The center of the near zero frequency of the residual jamming signal 68 is L. For the ratio of three (3), the lowest allowable center frequency for the IF signal 66 is calculated by $3 \times (L+K/2)+M/2$. In a numerical example, for K=6 MHz, L=2 MHz and M=6 MHz, the lowest center frequency for the IF signal 66 is 18 MHz and the high pass filter 62 should be designed to suppress signal frequencies up to 5 MHz and pass signal frequencies above 15 MHz. However, in order to avoid a need for fine frequency resolution and to include a margin for filter variation, the lowest center frequency of the IF signal 66 in the numerical example is preferably about 24 MHz for a ratio of $(24-3)/(2+3)=4.2$.

Alternatively, the frequency immunization converter 60 can use a TX offset frequency 381 having a known frequency offset from the TX center frequency 38 for converting the TX jamming signal 34B to a residual jamming signal 681 having that known frequency offset from zero frequency. In this alternative, the high pass filter 62 is replaced by a filter 621 having a series notch or a shunt trap tuned to the known frequency offset for suppressing the residual jamming signal 681 at the frequency of the offset.

In a simple case, the high pass filter 62 is a coupling capacitor or a shunt inductor. The coupling capacitor or shunt inductor may be a part of the frequency immunization converter 60 or the IF receiver 64.

The IF receiver 64 includes filters, amplifiers, oscillators, mixers, demodulators, local oscillators, summers, analog-to-digital converters and/or other like electronic elements for processing the high passed IF signal 66A for providing the output information 32.

The frequency immunization converter 60 includes one, two, or more frequency conversion stages for frequency converting the RX signal 30D and the TX jamming signal 34B to the IF signal 66 and the residual jamming signal 68. One or more of the frequency conversion stages may use complex frequency conversions having in-phase (I) and quadrature phase (Q) component signals. In a simple case, the frequency immunization converter 60 has a single frequency conversion stage having a local signal generator 72 and a mixer 74. The local signal generator 72 uses information for the TX center frequency 38 in the form of data from microprocessor system 22 and/or actual signals from signal generators in the transmitter 16 for recreating the center frequency of the TX signal in an LO signal. The mixer 74 multiplies the LO signal times the RX signal 30D for providing the IF signal 66. At the same time the mixer 74 uses the same LO signal for mixing the TX jamming signal 34B to the residual jamming signal 68 having signal frequencies relatively near to zero frequency.

There are several ways that are well known by those skilled in the art of generating and synthesizing signals by which the data for the TX center frequency 38 can be used for controlling the frequency of the local signal generator 72. For example, the data can be converted to an analog voltage and then the analog voltage used to control the frequency of a voltage controlled oscillator (VCO). For another example, the data can be used for setting one or more divide numbers in one or more loops that lock a VCO into a frequency relationship with the frequency of a reference oscillator. In another preferred embodiment the local signal generator 72 mixes, frequency divides, and/or frequency multiplies the actual signals from the transmitter 16 for recreating the center frequency of the TX signal 26. In another example, the local signal generator 72 uses a combination of data and actual signals from the transmitter 16 in order to recreate the TX center frequency 38.

It is understood by those skilled in the art that mixers typically produce many mixing products. These mixing products have frequencies of the sum and difference of the frequencies of the signals and harmonics of the signals received by the mixer. For example, an RX frequency of 2510 MHz and an LO frequency of 2603 MHz would typically result in mixer output signals of 93 MHz (LO−RX), −93 MHz (RX−LO), 5113 MHz (LO+RX), 2696 MHz (2nd harmonic of LO−RX), and many more combinations. For a mixer used as a frequency downconverter, the desired mixing product is separated from several undesired mixing products with a low pass filter. For the present invention a low pass filter is placed between or within the frequency immunization converter 60 and the front end of the IF receiver 64 for passing the desired mixing products at ±93 MHz and suppressing the unwanted mixing products at the other frequencies.

Figure 3:
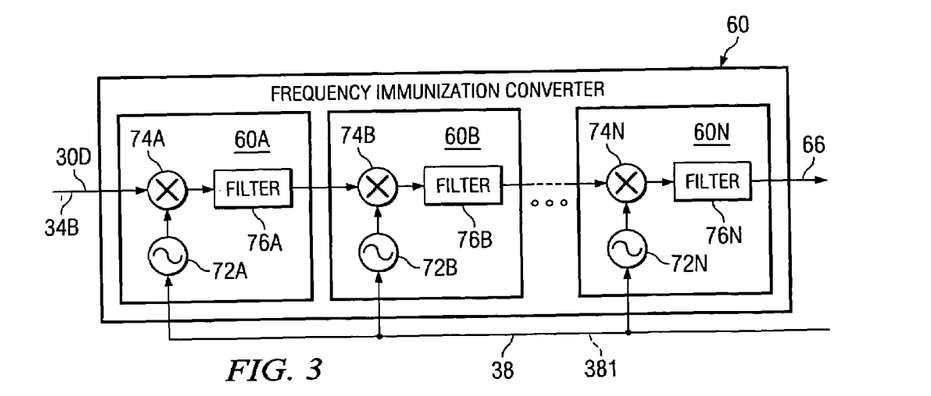
FIG. 3 is a block diagram of another embodiment of a frequency immunization converter of the receiver of FIG. 2.

FIG. 3 is a block diagram of the frequency immunization converter 60 having several frequency conversion stages in series represented by first through Nth frequency converters 60A–N, respectively. The first frequency converter 60A includes a local signal generator 72A, a mixer 74A, and a filter 76A. The local signal generator 72A generates an LO signal A. The mixer 74A mixes the LO signal A with the RX signal 30D and the TX jamming signal 34B for providing mixing products A to the filter 76A. The filter 76A suppresses the unwanted products of mixing products A and issues an IF signal A and an IF jamming signal A. The IF signal A can be higher or lower in frequency than the RX signal 30D. This process continues until the last frequency converter 60N.

The Nth frequency converter 60N includes a local signal generator 72N, a mixer 74N, and a filter 76N. The local signal generator 72N generates and LO signal N. The mixer 74N mixes the LO signal N with an IF signal N−1 and a TX jamming signal N−1 for providing mixing products N to the filter 76N. The filter 76N suppresses the unwanted products of mixing products N and issues the IF signal 66 and the residual jamming signal 68 described above. When only two frequency conversion stages are used, the IF signal N−1 is the IF signal A and the IF jamming signal N−1 is the IF jamming signal A.

When three frequency conversion stages are used, a frequency converter 60B including a local signal generator 72B, a mixer 74B, and a filter 76B is disposed between the first frequency converter 60A and the Nth frequency converter 60N. The local signal generator 72B generates an LO signal B. The mixer 74B mixes the LO signal B with the IF signal A and the IF jamming signal A for providing mixing products A to the filter 76B. The filter 76B suppresses the unwanted products of mixing products A and issues an IF signal B and an IF jamming signal B. In this case, the Nth frequency converter 60N receives the IF signal B and the IF jamming signal B as the IF signal N−1 and the IF jamming signal N−1, respectively.

A combination of sums and/or differences of the frequencies of the local signal generators 72A–72N is set to the TX center frequency 38. For example, for two frequency conversion stages the frequency of the LO signal A minus the frequency of the LO signal N; or the frequency of the LO signal A plus the frequency of the LO signal N; or the frequency of the LO signal N minus the frequency of the LO signal A can be set to the TX center frequency 38. For another example, for three frequency conversion stages the frequency of the LO signal A minus the frequency of the LO signal B minus the frequency of the LO signal N can be set to the TX center frequency 38. Importantly, the frequencies of the signals in the frequency conversion stages may be selected and the filters 76A–N may have pass and stop bands for avoiding and suppressing unwanted image frequencies.

Figure 4:
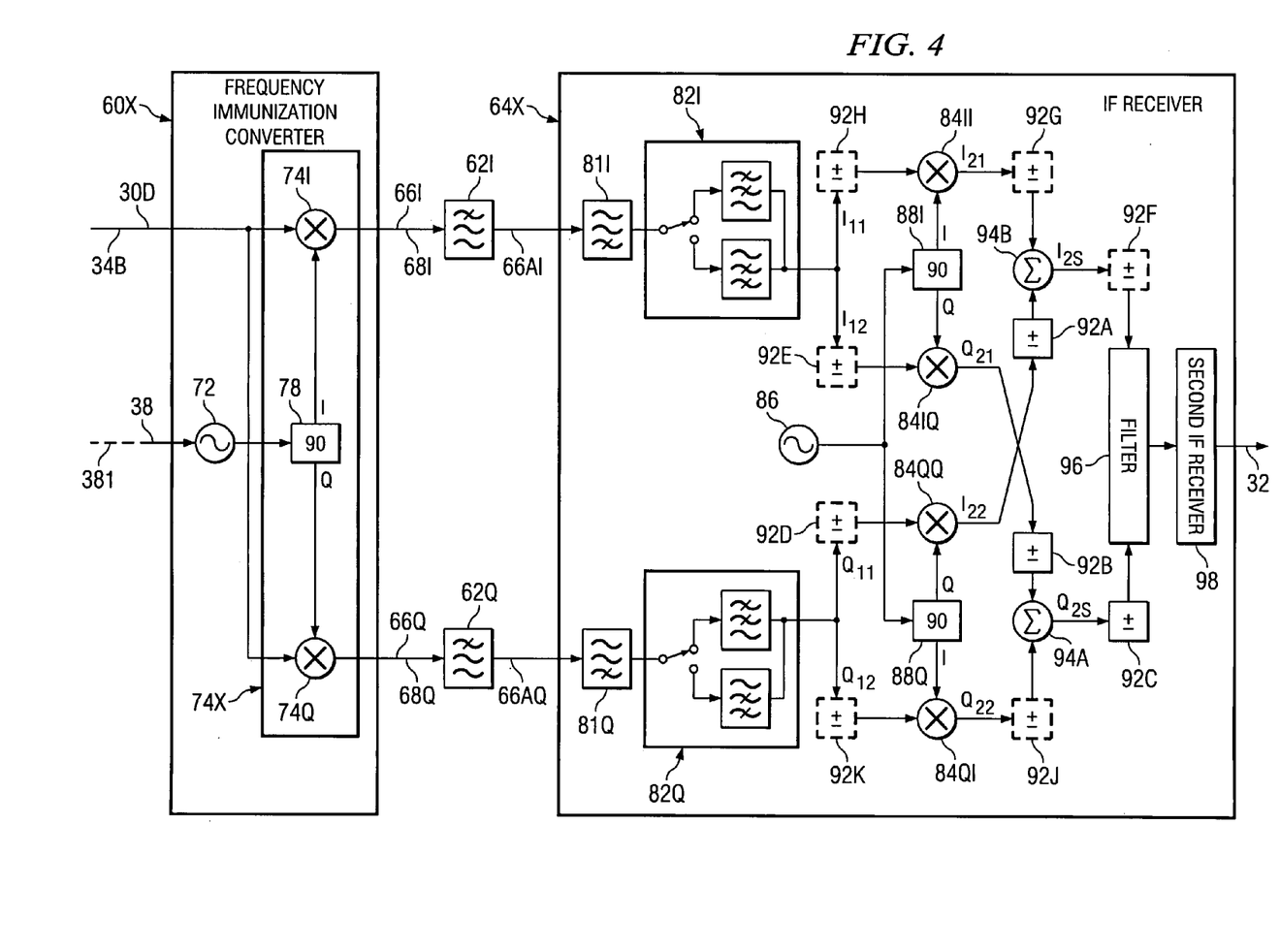
FIG. 4 is a block diagram of another embodiment of a frequency immunization converter of the receiver of FIG. 2.

FIG. 4 is a block diagram of a preferred embodiment of the present invention having a complex version of the frequency immunization converter 60 referred to with a reference identifier 60X and a complex version of the IF receiver 64 referred to with a reference identifier 64X.

The frequency immunization converter 60X includes the local signal generator 72 and a complex version of the mixer 74 referred to with a reference identifier 74X. The complex mixer 74X includes a 90 degree splitter 78, and in-phase (I) and quadrature phase (Q) mixers 74I and 74Q. The local signal generator 72 generates the LO signal at the LO frequency approximately equal to the TX center frequency 38. The 90 degree splitter 78 splits the LO signal into I and Q signal components and passes the I and Q signal components to the I and Q mixers 74I and 74Q, respectively.

The RX signal 30D and the TX jamming signal 34B are both received by both the I and Q mixers 74I and 74Q. The I mixer 74I multiplies the I component of the LO signal times both the RX signal 30D and the TX jamming signal 34B; and issues an I component IF signal 66I and an I component residual jamming signal 68I to a high pass filter 62I. The high pass filter 62I passes the IF signal 66I as an I component first IF signal 66AI and effectively eliminates the residual jamming signal 68I. Similarly, the Q mixer 74Q multiplies the Q component of the LO signal times both the RX signal 30D and the TX jamming signal 34B; and issues a Q component IF signal 66Q and a Q component residual jamming signal 68Q to a high pass filter 62Q. The high pass filter 62Q passes the IF signal 66Q as a Q component first IF signal 66AQ and effectively eliminates the residual jamming signal 68Q. The high pass filters 62I and 62Q are functionally equivalent to the high pass filter 62 described above for operating on a complex signal.

The IF receiver 64X preferably includes I and Q low pass filters 81I and 81Q; selectable image filters 82I and 82Q; mixers 84II, 84IQ, 84QQ and 84QI; a local signal generator 86; I and Q 90 degree splitters 88I and 88Q; A equivalent, B equivalent and C equivalent selectable inverters 92A, 92B and 92C, respectively; first and second summers 94A and 94B, respectively; a polyphase filter 96, also known as a vector filter; and a second IF receiver 98.

The I and Q low pass filters 81I and 81Q filter unwanted mixing products created by the mixers 74I and 74Q and pass a complex filtered first IF signal to the image filters 82I and 82Q. The image filters 82I and 82Q pass the filtered first IF signal and suppress image signal frequencies. The suppression band of the image filters 82I and 82Q is selected under control of the microprocessor system 22 (FIG. 1) as described below as a low pass filter as illustrated in FIG. 4 or as a high pass filter. In an alternative embodiment the image filters 82I and 82Q are bandpass filters having passbands controlled for passing signal frequencies around the first IF signal 66AI and 66AQ and suppressing other signal frequencies. In another alternative embodiment the image filters 82I and 82Q are notch filters controlled for trapping an undesired image frequency and passing other signal frequencies.

The mixer 84II receives a first I component of the image filtered first IF signal ($I_{11}$) from the image filter 82I. The mixer 84IQ receives a second I component of the image filtered first IF signal ($I_{12}$) from the image filter 82I. The mixer 84QQ receives a first Q component of the image filtered first IF signal from ($Q_{11}$) the image filter 82Q. The mixer 84QI receive a second Q component of the image filtered first IF signal ($Q_{12}$) from the image filter 82Q.

The local signal generator 86 generates a second LO signal and passes the signal to the 90 degree splitters 88I and 88Q. The frequency of the second LO signal from the local signal generator 86 is selected under control of the microprocessor system 22 (FIG. 1) as described below so that the difference frequency between frequency of the second LO signal and the frequency of the first IF signal is a predetermined second intermediate frequency. The 90 degree splitter 88I splits the second LO signal into I and Q components and passes the I component to the mixer 84II and the Q component to the mixer 84IQ. Similarly, the 90 degree splitter 88Q splits the second LO signal into I and Q components and passes the Q component to the mixer 84QQ and the I component to the mixer 84QI.

The mixer 84II multiplies a first component of the I first IF signal $I_{11}$ by the I component from the 90 degree splitter 88I and issues a first I component of a second IF signal ($I_{21}$) to a first input of the summer 94B. The mixer 84IQ multiplies a second I component of the I first IF signal $I_{12}$ by the Q component from the 90 degree splitter 88I and issues a first Q component of the second IF signal ($Q_{21}$) to a first input of the summer 94A through the selectable inverter 92B. The inverter 92B inverts or non-inverts the $Q_{21}$ under control of the microprocessor system 22 (FIG. 1). The mixer 84QQ multiplies a first Q component of the first IF signal $Q_{11}$ by the Q component from the 90 degree splitter 88Q and issues a second I component of the second IF signal ($I_{22}$) to a second input of the summer 94B through the selectable inverter 92A. The inverter 92A inverts or non-inverts the $I_{22}$ under control of the microprocessor system 22 (FIG. 1). The mixer 84QI multiplies a second Q component of the first IF signal $Q_{12}$ by the I component from the 90 degree splitter 88Q and issues a second Q component of the second IF signal ($Q_{22}$) to a second input of the summer 94A.

The summer 94B adds the first $I_{21}$ and second $I_{22}$ I components and issues a summation I component of the second IF signal ($I_{2S}$) to a first input of the polyphase filter 96. The summer 94A adds the first ($Q_{21}$) and second ($Q_{22}$)

Q components and issues a summation Q component of the second IF signal ($Q_{2S}$) through the selectable inverter 92C to a second input of the polyphase filter 96. The inverter 92C inverts or non-inverts the summation Q component $Q_{2S}$ under control of the microprocessor system 22 (FIG. 1). The selections of invert or non-invert in the A equivalent, B equivalent and C equivalent selectable inverters 92A–C are controlled by the microprocessor system 22 (FIG. 1) as described below.

The polyphase filter 96 suppresses signals having negative frequencies and combines the signals at its first and second inputs having positive frequencies for providing an image filtered second IF signal to the second IF receiver 98. The second IF receiver 98 processes the signal from the polyphase filter 96 for providing the baseband signal having the output information 32. In an alternative embodiment the mixers 84IQ and 84QI; and the inverters 92B and 92C are not included and the second IF receiver 98 processes a filtered summation I component for $I_{21}$ and $I_{22}$.

It is understood that frequency downconverters convert two input signal frequencies—the desired input signal frequency and an unwanted image input signal frequency—to the same output signal frequency. When the LO signal frequency is higher than the input signal frequency, the unwanted image input signal frequency is the sum of the input signal frequency plus twice the output signal frequency. When the LO signal frequency is lower than the incoming signal frequency, the unwanted image frequency is the input signal frequency minus twice the output signal frequency.

The switching of the second LO signal between frequencies above and below the first IF frequency is controlled in the IF receiver 64X by the microprocessor system 22 (FIG. 1) for avoiding the image signal frequencies that are expected or measured to be the worst (highest level) image signals accompanying the RX signal 30D. The image frequencies that not avoided are suppressed by the image filters 82I and 82Q, the 4 mixer quadrature mixing process of the IF receiver 64X, and the polyphase filter 96.

There are two cases that must be considered depending upon whether the TX center frequency 38 (and the LO frequency from the local signal generator 72) is greater or less than the frequency of the desired RX signal 30. In the first case, when the TX center frequency 38 is greater than the frequency of the desired RX signal 30, one of the selection alternatives 101 or 102 (FIG. 5) is used. In the second case, when the TX center frequency 38 is lower than the frequency for the desired RX signal 30, one of the selection alternatives 103 or 104 (FIG. 5) is used. It should be noted that the need for the alternative selections 101–104 in the IF receiver 64X for avoiding image signal frequencies is a result of two factors. First, the selection alternatives 101–102 (or 103–104) are needed to set the second LO frequency so that worst of the image frequencies are avoided. Second, the selection alternatives 101 and 104 (or 102 and 103) are needed to accommodate the frequency of the TX signal 26 either above or below the frequency of the RX signal 30.

There are several variations for the disposition of the inverters 92A–C in the block diagram of the IF receiver 64X within the scope of the present invention. In one variation, the A equivalent selectable inverter 92A for inverting or non-inverting the $I_{22}$ signal is embodied by a selectable inverter 92D disposed for inverting or non-inverting the $Q_{11}$ signal. In another variation, the B equivalent selectable inverter 92B for inverting or non-inverting the $Q_{21}$ signal is embodied by a selectable inverter 92E disposed for inverting or non-inverting the $I_{12}$ signal. In another variation, the A equivalent selectable inverter 92A for inverting or non-inverting the $I_{22}$ signal is embodied by a combination of a selectable inverter 92F disposed for inverting or non-inverting the $I_{2S}$ signal and one of a selectable inverter 92G for inverting or non-inverting the $I_{21}$ signal or a selectable inverter 92H disposed for inverting or non-inverting the $I_{11}$ signal.

In yet another variation, the B equivalent selectable inverter 92B for inverting or non-inverting the $Q_{21}$ signal is embodied by a combination of a change in control logic of the selectable inverter 92C and one of a selectable inverter 92J disposed for inverting or non-inverting the $Q_{22}$ signal or a selectable inverter 92K disposed for inverting or non-inverting the $Q_{12}$ signal. In this variation the selectable inverter 92C may be eliminated when the new logic is always invert or always non-invert. In another variation, the C equivalent selectable inverter 92C disposed for inverting or non-inverting the $Q_{2S}$ signal is embodied by a combination of a change in the control logic of the selectable inverter 92B and one of the selectable inverter 92J or the selectable inverter 92K. In this variation the selectable inverter 92B may be eliminated when the new logic is always invert or always non-invert.

Figure 5:
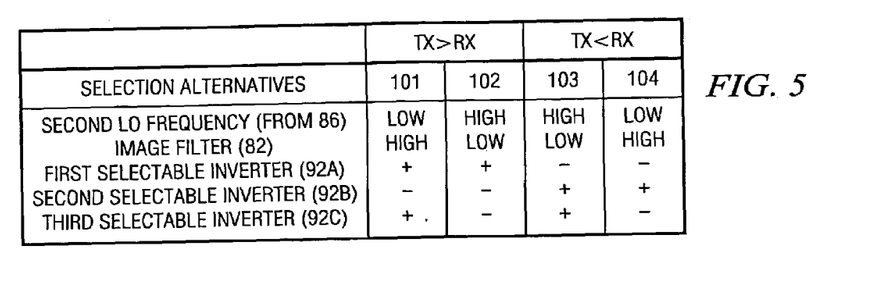
FIG. 5 is a table for programming image rejection for the transceiver of FIG. 1.

FIG. 5 is a table of selection alternatives 101–104. A one of the alternatives 101–104 is selected by programming in the microprocessor system 22 (FIG. 1) in order to avoid certain undesired incoming signal frequencies received with the desired RX signal 30D that result in unwanted image signal frequencies in the first IF signal that would otherwise be mixed into the second IF signal.

In the selection alternative 101, the second local signal generator 86 is set low to a second LO frequency below the first IF frequency, the image filters 82I and 82Q are set high pass in order to suppress frequencies below the first IF frequency, the inverter 92A is set to non-invert, the inverter 92B is set to invert, and the inverter 92C is set to non-invert. In the selection alternative 102, the second local signal generator 86 is set high to a second LO frequency above the first IF frequency, the image filters 82I and 82Q are set low to suppress frequencies above the first IF frequency, the inverter 92A is set to non-invert, the inverter 92B is set to invert, and the inverter 92C is set to invert. In the selection alternative 103, the second local signal generator 86 is set high to a second LO frequency above the first IF frequency, the image filters 82I and 82Q are set low to suppress frequencies above the first IF frequency, the inverter 92A is set to invert, the inverter 92B is set to non-invert, and the inverter 92C is set to non-invert. In the selection alternative 104, the second local signal generator 86 is set low to a second LO frequency below the first IF frequency, the image filters 82I and 82Q are set high to suppress frequencies below the first IF frequency, the inverter 92A is set to invert, the inverter 92B is set to non-invert, and the inverter 92C is set to invert. It should be noted that selection alternatives 101 and 103 reverse the spectrum of the incoming RX signal 30. Preferably, this spectrum reversal is compensated by a reversal in the second IF receiver 98. It should also be noted that the polarities all of the selectable inverters 92A–C can be reversed when appropriate fixed signal inversions are disposed elsewhere in the IF receiver 64X.

Returning to FIG. 4, the image rejection in the IF receiver 64X is most easily understood with numerical examples. In the first case, assume the TX center frequency 38 (and the LO frequency from the local signal generator 72) is 2603 MHz and the frequency of the desired RX signal 30 is 2510

MHz. The IF signal 66I and 66Q is 93 MHz and the undesired image frequency that is suppressed by the combination of the complex frequency conversion in the frequency immunization converter 74X and complex frequency conversions and inversions in the IF receiver 64X is 2696 MHz. In the second case, assume the TX center frequency 38 (and the LO frequency from the local signal generator 72) is 2510 MHz and the frequency of the desired RX signal 30 is 2603 MHz. The IF signal 66I and 66Q is 93 MHz and the undesired image frequency that is suppressed by the combination of the complex frequency conversion in the frequency immunization converter 74X and complex frequency conversions and inversions in the IF receiver 64X is 2417 MHz.

Continuing the numerical example, assume the predetermined frequency of the second IF signal is 20 MHz. The frequency of the local signal generator 86 is set to either 73 MHz or 113 MHz for downconverting the first IF frequency of 93 MHz to the second IF frequency of 20 MHz; and the undesired image frequencies are either 53 or 133 MHz, respectively. In the first case, the first LO signal frequency of 2603 MHz in the frequency immunization converter 60X downconverts signal frequencies of 2550 and 2656 MHz to the undesired image frequency of 53 MHz and downconverts signal frequencies of 2470 and 2736 MHz to the undesired image frequency of 133 MHz. The IF receiver 64X is programmed to the selection alternative 101 or 102 to set the second LO frequency to 73 or 113 MHz, respectively, in order to avoid the undesired signal frequency pair 2550 and 2656 MHz or 2470 and 2736 MHz, respectively, that is determined to have the largest signal. The undesired signal frequencies in the other pair are suppressed by the combination of the filters, 90 degree phase shifts, and inversions the frequency immunization converter 74X and in the IF receiver 64X.

In the second case the first LO frequency of 2510 in the frequency immunization converter 60X downconverts signal frequencies of 2457 and 2563 MHz to the undesired image frequency of 53 MHz and downconverts signal frequencies of 2377 and 2643 MHz to the undesired image frequency of 133 MHz. The IF receiver 64X is programmed to the selection alternative 103 or 104 to set the second LO frequency to 73 or 113 MHz, respectively, in order to avoid the undesired signal frequency pair 2457 and 2563 MHz or 2377 and 2643 MHz, respectively, that is determined to have the largest signal. The undesired signal frequencies in the other pair are suppressed by the combination of the filters, 90 degree phase shifts, and inversions the frequency immunization converter 74X and in the IF receiver 64X.

Figure 6:
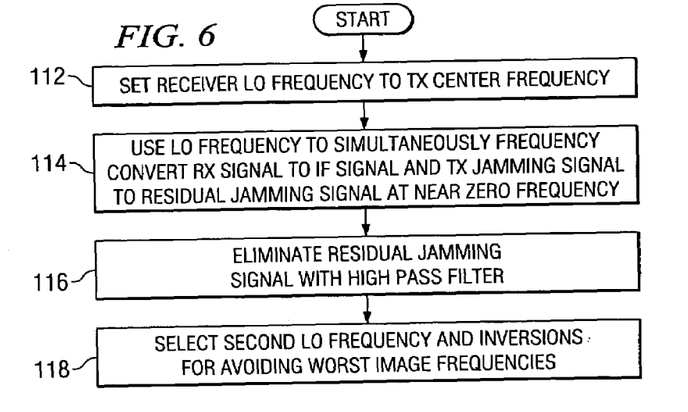
FIG. 6 is a flow chart of a method for immunizing the transceiver of FIG. 1 from self-jamming.

FIG. 6 is flow chart of a method in the transceiver 10 for immunizing the receiver 20 from self-jamming by the TX jamming signal 34. In a step 112 the receiver 20 sets the LO frequency of the local signal generator 72 to the TX center frequency 38. In a step 114 the frequency immunization converter 60 uses the LO frequency at the TX center frequency 38 for simultaneously frequency downconverting the desired RX signal 30 and the undesired TX jamming signal 34 to the desired IF signal 66 at an IF frequency and the residual jamming signal 68 at near to zero frequency, respectively. In a step 116, the high pass filter 62 passes the desired IF signal 66 and effectively eliminates the residual jamming signal 68. Then, in a step 118 the IF receiver 64 (or 64X) selects a second LO frequency and signal inversions for avoiding the worst of the undesired image frequencies.

Figure 7:
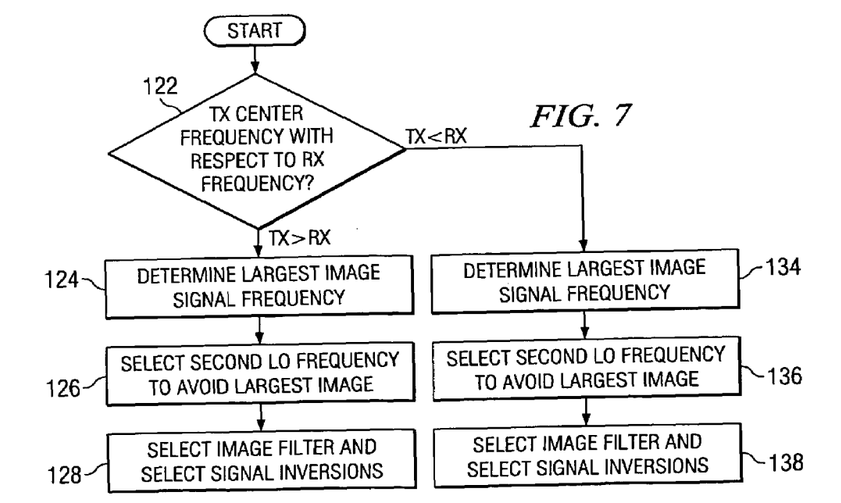
FIG. 7 is a flow chart for avoid certain undesired image frequencies in the transceiver of FIG. 1.

FIG. 7 is a flow chart of a method for avoiding undesired image frequencies in the present invention. In a step 122 the LO signal of the local signal generator 72 is set to the TX center frequency 38. The TX center frequency 38 is either greater than or less than the RX frequency of the RX signal 30. When the TX center frequency 38 is greater than the frequency of the RX signal 30, the microprocessor system 22 selects one of selection alternatives 101 and 102. When the TX center frequency 38 is less than the RX frequency of the RX signal 30, the microprocessor system 22 selects one of selection alternative 103 and 104.

In a step 124 for TX center frequency 38 greater than the RX frequency, the frequency of the largest image signal for the second IF frequency that accompanies the RX signal 30D is determined. The determination may be a pre-determination based upon an expected signal environment or a measurement of the signals accompanying the RX signal 30D after the filtering of the splitter 14 and the bandpass filter 52.

Continuing to use the numerical example above, one pair of image frequencies is 2550 and 2656 MHz and the other pair is 2470 and 2736 MHz. In a step 126 when either 2550 or 2656 MHz is determined to be the largest image signal, the selection alternative 102 is chosen for setting the second LO frequency above the first IF signal 66I and 66Q. In the present example the second LO frequency is set to 113 MHz. When either 2470 or 2736 MHz is determined to be the largest image signal, the selection alternative 101 is chosen for setting the second LO frequency below the first IF frequency. In the present example the second LO frequency is set to 73 MHz. Then, in a step 128, the image filters 82I and 82Q, and the inversions of the selectable inverters 92A–C are then selected for passing the desired IF frequencies and suppressing the other pair of image signal frequencies.

In a step 134 for TX center frequency 38 less than the frequency of the RX signal 30, the frequency of the largest image signal for the second IF frequency that accompanies the RX signal 30D is determined. The determination may be a pre-determination based upon an expected signal environment or a measurement of the signals accompanying the RX signal 30D after the filtering of the splitter 14 and the bandpass filter 52.

Continuing to use the numerical example above, one pair of image frequencies is 2457 and 2563 MHz and the other pair is 2377 and 2643 MHz. In a step 136 when either 2457 or 2563 MHz is determined to be the largest image signal, the selection alternative 103 is chosen for setting the second LO frequency above the first IF signal 66I and 66Q. In the present example the second LO frequency is set to 113 MHz. When either 2377 or 2643 MHz is determined to be the largest image signal, the selection alternative 104 is chosen for setting the second LO frequency below the first IF frequency. In the example the second LO frequency is set to 73 MHz. Then, in a step 138, the image filters 82I and 82Q, and the inversions of the selectable inverters 92A–C are then selected for passing the desired IF frequencies and suppressing the other pair of image signal frequencies.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A transceiver having self-jamming immunization, comprising:
a microprocessor;
a transmitter coupled to said microprocessor, said transmitter comprising one or more signal generators having frequencies that are controlled by frequency data from said microprocessor for setting a TX center frequency and for transmitting a transmit (TX) signal having a TX center frequency in a selected subchannel; and
a receiver including:
a plurality of local signal generators coupled to said microprocessor;
a frequency immunization converter for using data from said microprocessor and said TX center frequency for simultaneously frequency downconverting a desired receive (RX) signal and an undesired TX jamming signal to a desired intermediate frequency (IF) signal at an IF frequency and a residual jamming signal at near to zero frequency, respectively;
an IF receiver coupled to and under control of said microprocessor for processing said IF signal for providing output information representative of information carried on said RX signal.

2. The transceiver of claim 1, wherein:
the receiver further includes a filter for blocking signal frequencies at near to zero frequency and passing signal frequencies around said IF frequency.

3. The transceiver of claim 1, wherein:
a ratio of said IF frequency to a frequency of said residual jamming signal is at least three.

4. The transceiver of claim 1, wherein:
said frequency immunization converter includes sequential frequency converters coupled in series, a first of said frequency converters receiving said RX signal and said TX jamming signal and a last of said frequency converters providing said desired IF signal and said residual jamming signal, said frequency converters including a respective local signal generators coupled to said microprocessor for providing respective LO signals at respective LO frequencies, said LO frequencies controlled using data from said microprocessor so that a combination of said LO frequencies is about equal to said TX center frequency.

5. The transceiver of claim 4, wherein:
said combination includes at least one of (i) a difference between a first of said LO frequencies and a second of said LO frequencies and (ii) a sum of a first of said LO frequencies and a second of said LO frequencies.

6. The transceiver of claim 1, further comprising:
an IF receiver for processing said IF signal for providing output information representative of information carried on said RX signal.

7. The transceiver of claim 1, wherein:
a first local signal generator of said plurality of local signal generators is for generating a first LO signal at a first LO frequency about equal to said TX center frequency; and a first mixer using said first LO signal for frequency downconverting said RX signal to said desired IF signal while frequency converting said TX jamming signal to said residual jamming signal.

8. The transceiver of claim 7, wherein:
said first mixer is a complex mixer for providing said IF signal as a complex first IF signal.

9. The transceiver of claim 8, wherein:
a second local signal generator of said plurality of local signal generators is for generating a second LO signal at a second LO frequency controlled to be one of a high frequency or a low frequency according to said TX center frequency with respect to a frequency of said RX signal and an expected level of an undesired image signal, said high frequency equal to said first IF frequency plus a second IF frequency and said low frequency equal to said first IF frequency minus said second IF frequency.

10. The transceiver of claim 9, wherein:
the receiver further includes an II mixer using an I component of said second LO signal for frequency converting a first I component of said first IF signal ($I_{11}$) to a first I component of a second IF signal ($I_{21}$); an IQ mixer using a Q component of said second LO signal for frequency converting a second I component of said first IF signal ($I_{12}$) to a first Q component of a second IF signal ($Q_{21}$); a QQ mixer using a Q component of said second LO signal for frequency converting a first Q component of said first IF signal ($Q_{11}$) to second I component of said second IF signal ($I_{22}$); a QI mixer using an I component of said second LO signal for frequency converting a second Q component of said first IF signal ($Q_{12}$) to a second Q component of said second IF signal ($Q_{22}$); a first summer for summing said $Q_{21}$ and said $Q_{22}$ for providing a summation Q component of said second IF signal ($Q_{2S}$); and a C equivalent selectable inverter for switching between invert and non-invert of one of (i) said $Q_{2S}$ or (ii) one of said $I_{12}$ and said $Q_{21}$ and one of said $Q_{12}$ and said $Q_{22}$ according to said second LO frequency at said high or low frequency.

11. The transceiver of claim 10, wherein:
the receiver further includes a second summer for summing said and said $I_{21}$ for providing a summation I component of said second F signal ($I_{2S}$); an A equivalent selectable inverter controlled for switching between invert and non-invert one of (i) said $I_{22}$ and (ii) said $I_{21}$ and one of said $I_{11}$, and said $I_{21}$ according to said TX center frequency with respect to an RX frequency of said RX signal; and a B equivalent selectable inverter for switching between invert and non-invert of one (i) said $Q_{2S}$ and one of said $Q_{21}$ and said $I_{12}$, and (ii) said $Q_{22}$ and said $Q_{12}$ according to said TX center frequency with respect to an RX frequency of said RX signal.

12. A method of immunizing against self-jamming in a full-duplex communication system using a single antenna to transmit and receive, said method comprising:
setting a TX center frequency of a transmit TX signal using data from a microprocessor;
selecting a subchannel;
transmitting said transmit (TX) signal in said selected subchannel; and
using data from said microprocessor and said TX center frequency for frequency downconverting a desired receive (RX) signal and simultaneously frequency downconverting an undesired TX jamming signal corresponding to said TX signal for providing a desired IF signal at an IF frequency and a residual jamming signal at near to zero frequency, respectively.

13. The method of claim 12, further comprising:
blocking signal frequencies at near to zero frequency and passing signal frequencies around said IF frequency.

14. The method of claim 12, wherein:

a ratio of said IF frequency to a frequency of said residual jamming signal is at least three.

15. The method of claim 12, wherein:

frequency downconverting includes frequency converting said RX signal and said TX jamming signal in a sequential series of frequency conversions, said frequency conversions using respective LO signals having respective LO frequencies, said LO frequencies selected so that a combination of said LO frequencies is about equal to said TX center frequency.

16. The method of claim 12, wherein:

said combination includes at least one of (i) a difference between a first of said LO frequencies and a second of said LO frequencies and (ii) a sum of a first of said LO frequencies and a second of said LO frequencies.

17. The method of claim 12, further comprising:

processing said IF signal for providing output information representative of information carried on said RX signal.

18. The method of claim 12, wherein:

frequency downconverting includes generating a first LO signal at a first LO frequency about equal to said TX center frequency; and mixing said first LO signal with said RX signal and said TX jamming signal for providing said desired first IF signal and said residual jamming signal, respectively.

19. The method of claim 18, wherein:

said frequency downconverting providing said first IF signal as a complex first IF signal.

20. The method of claim 19, further comprising:

determining an expected level of an undesired image signal; and controlling a second LO frequency of a second LO signal to be one of a high frequency and a low frequency according to said TX center frequency with respect to a frequency of said RX signal and said expected level of an undesired image signal, said high frequency equal to said first IF frequency plus a predetermined second IF frequency and said low frequency equal to said first IF frequency minus said second IF frequency.

21. The method of claim 20, further comprising:

using an I component of said second LO signal for frequency converting a first I component of said first IF signal ($I_{11}$) to a first I component of a second IF signal ($I_{21}$);

using a Q component of said second LO signal for frequency converting a second I component of said first IF signal ($I_{12}$) to a first Q component of a second IF signal ($Q_{21}$);

using a Q component of said second LO signal for frequency converting a first Q component of said first IF signal ($Q_{11}$) to second I component of said second IF signal ($I_{22}$);

using an I component of said second LO signal for frequency converting a second Q component of said first IF signal ($Q_{12}$) to a second Q component of said second IF signal ($Q_{22}$);

summing said $Q_{21}$ and said $Q_{12}$ for providing a summation Q component of said second IF signal ($Q_{2S}$); and switching between inverting and non-invert of one of (i) $Q_{2S}$ and (ii) one of said $I_{12}$ and said $Q_{21}$ and one of said $Q_{12}$ and said $Q_{22}$ according to second LO signal at said high and low frequency.

22. The method of claim 21, further comprising:

summing said $I_{21}$ and said $I_{12}$ for providing a summation I component of said second IF signal ($I_{2S}$);

switching between inverting and non-invert of one of (i) said $I_{22}$ and (ii) said $I_{2S}$ and one of said $I_{11}$, and $I_{22}$ according to said TX center frequency with respect to an RX frequency, of said RX signal; and switching between inverting and non-invert of one (i) said $Q_{2S}$ and one of said $Q_{21}$ and said $I_{12}$, and (ii) said $Q_{11}$ and said $Q_{21}$ according to said TX center frequency with respect to an RX frequency of said RX signal.

23. A transceiver having self-jamming immunization, comprising:

a microprocessor;

a transmitter coupled to said microprocessor, said transmitter comprising one or more signal generators having frequencies that are controlled by frequency data from said microprocessor for setting a TX center frequency and for transmitting a transmit (TX) signal having a TX center frequency in a selected subchannel; and a receiver including a frequency immunization converter for using an LO frequency at a known frequency offset using data from said microprocessor and from said TX center frequency for simultaneously frequency downconverting a desired receive (RX) signal and an undesired TX jamming signal to a desired intermediate (IF) signal at an IF frequency and a residual jamming signal at said known frequency offset, respectively.

24. The transceiver of claim 23, wherein:

the receiver further includes a filter tuned to said known frequency offset for blocking signal frequencies near to said known offset frequency and passing signal frequencies near to said IF frequency.

25. The transceiver of claim 23, wherein:

said frequency immunization converter includes sequential frequency converters coupled in series, a first of said frequency converters receiving said RX signal and said TX jamming signal and a last of said frequency converters providing said desired IF signal and said residual jamming signal, said frequency converters including a respective local signal generators for providing respective LO signals at respective LO frequencies, said LO frequencies selected so that a combination of said LO frequencies is about equal to a frequency at said known frequency offset from said TX center frequency.

26. A method of immunizing against self-jamming in a full-duplex communication system using a single antenna to transmit and receive, comprising:

setting a TX center frequency of a transmit TX signal using data from a microprocessor;

selecting a subchannel;

transmitting said transmit (TX) signal on said selected subchannel; and using said data from said microprocessor and said TX center frequency at a known frequency offset for frequency downconverting a desired receive (RX) signal and simultaneously frequency downconverting an undesired TX jamming signal corresponding to said TX signal for providing a desired IF signal at an IF frequency and a residual jamming signal at said known frequency offset, respectively.

27. The method of claim 26, wherein:

blocking signal frequencies near to said known offset frequency and passing signal frequencies near to said IF frequency.

28. The method of claim 26, wherein:
frequency downconverting includes frequency converting said RX signal and said TX jamming signal in a sequential series of frequency conversions, said frequency conversions using respective LO signals having respective LO frequencies, said LO frequencies selected so that a combination of said LO frequencies is about equal to a frequency at said known frequency offset from said TX center frequency.

* * * * *